United States Patent
Zhang et al.

(10) Patent No.: US 11,769,239 B1
(45) Date of Patent: Sep. 26, 2023

(54) MODEL BASED DOCUMENT IMAGE ENHANCEMENT

(71) Applicant: Intuit Inc., Mountain View, CA (US)

(72) Inventors: Jiaxin Zhang, Mountain View, CA (US); Tharathorn Joy Rimchala, San Francisco, CA (US); Lalla Mouatadid, Toronto (CA); Kamalika Das, Saratoga, CA (US); Sricharan Kallur Palli Kumar, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/144,638

(22) Filed: May 8, 2023

(51) Int. Cl.
| | |
|---|---|
| G06T 7/00 | (2017.01) |
| G06V 10/70 | (2022.01) |
| G06T 9/00 | (2006.01) |
| G06V 30/10 | (2022.01) |
| G06T 5/00 | (2006.01) |

(52) U.S. Cl.
CPC ............ G06T 7/0002 (2013.01); G06T 5/002 (2013.01); G06T 9/00 (2013.01); G06V 10/70 (2022.01); G06V 30/10 (2022.01); *G06T 2207/20081* (2013.01); *G06T 2207/30168* (2013.01)

(58) Field of Classification Search
None
See application file for complete search history.

(56) References Cited

U.S. PATENT DOCUMENTS

2010/0284623 A1* 11/2010 Chen .................... G06V 30/414
382/224

FOREIGN PATENT DOCUMENTS

CN 113516136 A * 10/2021

OTHER PUBLICATIONS

Anvari et al., "A survey on deep learning based document image enhancement," arXiv preprint arXiv:2112.02719, 2021.
Bake et al., "Removing shadows from images of documents," in Asian Conference on Computer Vision, pp. 173-183. Springer, 2016.
Balaji et al., "ediffi: Text-to-image diffusion models with an ensemble of expert denoisers," arXiv preprint arXiv:2211.01324, 2022.
Calvo-Zaragoza et al., "A selectional auto-encoder approach for document image binarization," Pattern Recognition, 86:37-47, 2019.

(Continued)

*Primary Examiner* — Bernard Krasnic
(74) *Attorney, Agent, or Firm* — Paradice & Li LLP

(57) ABSTRACT

Systems and methods are disclosed for model based document image enhancement. Instead of requiring paired dirty and clean images for training a model to clean document images (which may cause privacy concerns), two models are trained on the unpaired images such that only the dirty images are accessed or only the clean images are accessed at one time. One model is a first implicit model to translate the dirty images from a source space to a latent space, and the other model is a second implicit model to translate the images from the latent space to clean images in a target space. The second implicit model is trained based on translating electronic document images in the target space to the latent space. In some implementations, the implicit models are diffusion models, such as denoising diffusion implicit models based on solving ordinary differential equations.

12 Claims, 7 Drawing Sheets

(56) References Cited

OTHER PUBLICATIONS

Chen, Hanting et al., "Pre-trained image processing transformer," In Proceedings of the IEEE/CVF Conference on Computer Vision and Pattern Recognition, pp. 12299-12310, 2021.
Chen, Jieneng et al., "Transunet: Transformers make strong encoders for medical image segmentation," arXiv preprint arXiv:2102.04306, 2021.
Choi et al., "Ilvr: Conditioning method for denoising diffusion probabilistic models," in 2021 IEEE/CVF International Conference on Computer Vision (ICCV), pp. 14347-14356. IEEE Computer Society, 2021.
Clausner et al., "Icdar2017 competition on recognition of documents with complex layouts-rdcl2017," in 2017 14th IAPR International Conference on Document Analysis and Recognition (ICDAR), vol. 1, pp. 1404-1410. IEEE, 2017.
Dhariwal et al., "Diffusion models beat gans on image synthesis," Advances in Neural Information Processing Systems, 34:8780-8794, 2021.
Feng et al., "Training-free structured diffusion guidance for compositional text-to-image synthesis," arXiv preprint arXiv:2212.05032, 2022.
Gangeh et al., "End-to-end unsupervised document image blind denoising," In Proceedings of the IEEE/CVF International Conference on Computer Vision, pp. 7888-7897, 2021.
Goodfellow et al., "Generative adversarial networks," Communications of the ACM, 63(11):139-144, 2020.
Ho et al. "Denoising diffusion probabilistic models," Advances in Neural Information Processing Systems, 33:6840-6851, 2020.
Jung et al., "Water-filling: An efficient algorithm for digitized document shadow removal," in Asian Conference on Computer Vision, pp. 398-414. Springer, 2018.
Kawar et al., "Denoising diffusion restoration models," arXiv preprint arXiv:2201.11793, 2022.
Kligler et al., "Document enhancement using visibility detection," In Proceedings of the IEEE Conference on Computer Vision and Pattern Recognition, pp. 2374-2382, 2018.
Kwon et al., "Diffusion models already have a semantic latent space," arXiv preprint arXiv:2210.10960, 2022.
Li, Deng et al., "Sauvolanet: learning adaptive sauvola network for degraded document binarization," in International Conference on Document Analysis and Recognition, pp. 538-553. Springer, 2021.
Li, Gen et al., "Adaptive prototype learning and allocation for few-shot segmentation," in Proceedings of the IEEE/CVF Conference on Computer Vision and Pattern Recognition, pp. 8334-8343, 2021.
Lin et al., "Bedsr-net: A deep shadow removal network from a single document image," in Proceedings of the IEEE/CVF Conference on Computer Vision and Pattern Recognition, pp. 12905-12914, 2020.
Liu et al., "Invertible denoising network: A light solution for real noise removal," in Proceedings of the IEEE/CVF conference on computer vision and pattern recognition, pp. 13365-13374, 2021.
Meng et al., "Sdedit: Image synthesis and editing with stochastic differential equations," arXiv preprint arXiv:2108.01073, 2021.
Ramesh et al., "Hierarchical text-conditional image generation with clip latents," arXiv preprint arXiv:2204.06125, 2022.
Rombach et al., "High-resolution image synthesis with latent diffusion models," in Proceedings of the IEEE/CVF Conference on Computer Vision and Pattern Recognition, pp. 10684-10695, 2022.
Ruiz et al., "Dreambooth: Fine tuning text-to-image diffusion models for subject-driven generation," arXiv preprint arXiv:2208.12242, 2022.
Saharia et al., "Photorealistic text-to-image diffusion models with deep language understanding," arXiv preprint arXiv:2205.11487, 2022.
Sasaki et al., "Unitddpm: Unpaired image translation with denoising diffusion probabilistic models," arXiv preprint arXiv:2104.05358, 2021.
Schuhmann et al., "Laion-5b: An open large-scale dataset for training next generation image-text models," arXiv preprint arXiv:2210.08402, 2022.
Sharma et al., "Learning to clean: A gan perspective," in Asian Conference on Computer Vision, pp. 174-185. Springer, 2018.
Shi et al., "Charformer: A glyph fusion based attentive framework for high-precision character image denoising," in Proceedings of the 30th ACM International Conference on Multimedia, pp. 1147-1155, 2022.
Sohl-Dickstein et al., "Deep unsupervised learning using nonequilibrium thermodynamics," In International Conference on Machine Learning, pp. 2256-2265. PMLR, 2015.
Song, Jiaming et al., "Denoising diffusion implicit models," in International Conference on Learning Representations, 2020.
Song, Yang et al., "Generative modeling by estimating gradients of the data distribution," Advances in Neural Information Processing Systems, 32, 2019.
Song, Yang et al., "Score-based generative modeling through stochastic differential equations," in International Conference on Learning Representations, 2020.
Song, Yang et al. "Solving inverse problems in medical imaging with score-based generative models," in International Conference on Learning Representations, 2021.
Souibgui et al., "Docentr: an end-to-end document image enhancement transformer," in 2022 26th International Conference on Pattern Recognition (ICPR), pp. 1699-1705. IEEE, 2022.
Souibgui et al., "De-gan: a conditional generative adversarial network for document enhancement," IEEE Transactions on Pattern Analysis and Machine Intelligence, 2020.
Su et al., "Dual diffusion implicit bridges for image-to-image translation," arXiv preprint arXiv:2203.08382, 2022.
Wang, Jifeng et al., "Stacked conditional generative adversarial networks for jointly learning shadow detection and shadow removal," in Proceedings of the IEEE Conference on Computer Vision and Pattern Recognition, pp. 1788-1797, 2018.
Wang, Zhendong et al., "Uformer: A general u-shaped transformer for image restoration," in Proceedings of the IEEE/CVF Conference on Computer Vision and Pattern Recognition, pp. 17683-17693, 2022.
Wu et al., "Unifying diffusion models' latent space, with applications to cyclediffusion and guidance," arXiv preprint arXiv:2210.05559, 2022.
Xie et al., "Image denoising and inpainting with deep neural networks," Advances in neural information processing systems, 25, 2012.
Xu et al., "Learning to superresolve blurry face and text images," in Proceedings of the IEEE international conference on computer vision, pp. 251-260, 2017.
Zhang, Jiulong et al., "A novel generative adversarial net for calligraphic tablet images denoising," Multimedia Tools and Applications, 79(1):119-140, 2020.
Zhang, Kai et al., "Beyond a gaussian denoiser: Residual learning of deep cnn for image denoising," IEEE transactions on image processing, 26(7):3142-3155, 2017.
Zhao, Guoping et al., "Skip-connected deep convolutional autoencoder for restoration of document images," in 2018 24th International Conference on Pattern Recognition (ICPR), pp. 2935-2940. IEEE, 2018.
Zhao, Min et al., "Egsde: Unpaired image-to-image translation via energy-guided stochastic differential equations," arXiv preprint arXiv:2207.06635, 2022.
Zhu et al., "Unpaired image-to-image translation using cycle-consistent adversarial networks," in Proceedings of the IEEE international conference on computer vision, pp. 2223-2232, 2017.

\* cited by examiner

200

210

220

230

240

250

US 11,769,239 B1

MODEL BASED DOCUMENT IMAGE ENHANCEMENT

TECHNICAL FIELD

This disclosure relates generally to electronic image enhancement, including a cycle-consistent diffusion model for document image enhancement.

DESCRIPTION OF RELATED ART

Various paper documents may be scanned or otherwise captured to generate an electronic copy of the document. For example, a scanner or camera may be used to scan paper medical records, invoices, personal notes, government documents, and so on to generate electronic documents. Scanning may capture any number of noises, environmental effects, or other undesired effects that are generated in the electronic document. For example, inherent camera noise or creases in the paper may appear as noise in the electronic document. In addition, any shadows that exist on the paper document during scanning may exist in the electronic document. Further, an improper focal length of the camera may cause an electronic document to appear blurry. Other items in the paper document that may cause undesired effects in the electronic document may include watermarks, faded text or other information in the document, or stains in the document.

Optical character recognition (OCR) is performed on an electronic document to identify the text in the document to generate the text into a computer readable form. However, OCR quality is negatively affected by many undesired effects in the electronic document from the scanning process. As such, some electronic documents may need to be enhanced to remove or reduce such undesired effects in order to improve the OCR quality for the document.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

Systems and methods are disclosed for model based document image enhancement. Many image enhancement models require paired dirty and clean images in order to train the model. Instead of using a model requiring paired dirty and clean images for training (which may cause privacy concerns), two separate models may be used. The first model translates dirty (degraded quality) images to a latent space, and the second model translates images in the latent space to a clean space. The two models are trained on unpaired dirty and clean images such that only the dirty images are accessed or only the clean images are accessed at one time. In this manner, data privacy is preserved when configuring and training the models.

One innovative aspect of the subject matter described in this disclosure can be implemented as a computer-implemented method for document image enhancement. The method includes obtaining an electronic document image by a machine learning (ML) model. The electronic document image is generated from scanning a physical document. The method also includes enhancing the electronic document image by the ML model. Enhancing the electronic document image includes translating the electronic document image in a source space to a latent space by a first implicit probabilistic model of the ML model, with the first implicit probabilistic model being trained based on translating electronic document images in the source space to the latent space. Enhancing the electronic document image also includes translating the electronic document image in the latent space to a target space by a second implicit probabilistic model of the ML model. The second implicit probabilistic model is trained independently from the first implicit probabilistic model, and the second implicit probabilistic model is trained based on translating electronic document images in the target space to the latent space. The method further includes providing the electronic document image in the target space for an object character recognition (OCR) engine to perform OCR. In some implementations, the method includes performing OCR on the document image in the target domain by the OCR engine to generate an OCR document.

Another innovative aspect of the subject matter described in this disclosure can be implemented in a computing system for document image enhancement. The computing system includes one or more processors and a memory storing instructions that, when executed by the one or more processors, cause the system to perform operations. The operations include obtaining an electronic document image by a ML model. The electronic document image is generated from scanning a physical document. The operations also include enhancing the electronic document image by the ML model. Enhancing the electronic document image includes translating the electronic document image in a source space to a latent space by a first implicit probabilistic model of the ML model, with the first implicit probabilistic model being trained based on translating electronic document images in the source space to the latent space. Enhancing the electronic document image also includes translating the electronic document image in the latent space to a target space by a second implicit probabilistic model of the ML model. The second implicit probabilistic model is trained independently from the first implicit probabilistic model, and the second implicit probabilistic model is trained based on translating electronic document images in the target space to the latent space. The operations further include providing the electronic document image in the target space for an object character recognition (OCR) engine to perform OCR. In some implementations, the operations include performing OCR on the document image in the target domain by the OCR engine to generate an OCR document.

In some implementations, the first implicit probabilistic model includes a first cycle consistent model to translate the electronic document image between the source domain and the latent domain, and the second implicit probabilistic model includes a second cycle consistent model to translate the electronic document image between the latent domain and the target domain. For example, the first cycle consistent model may include a first denoising diffusion implicit model (DDIM) based on solving a first ordinary differential equation (ODE) for encoding the electronic document image from the source domain to the latent domain, and the second cycle consistent model includes a second DDIM based on solving a second ODE for encoding the electronic document image from the target domain to the latent domain.

In some implementations, a training data is used to train the first implicit probabilistic model and the second implicit probabilistic model, and the training data includes a first set of document images in the source domain and a second set of document images in the target domain. Training the first implicit probabilistic model and the second implicit probabilistic model includes processing only one of the first set of document images or the second set of document images at one time while preventing the other set of document images from being accessed.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
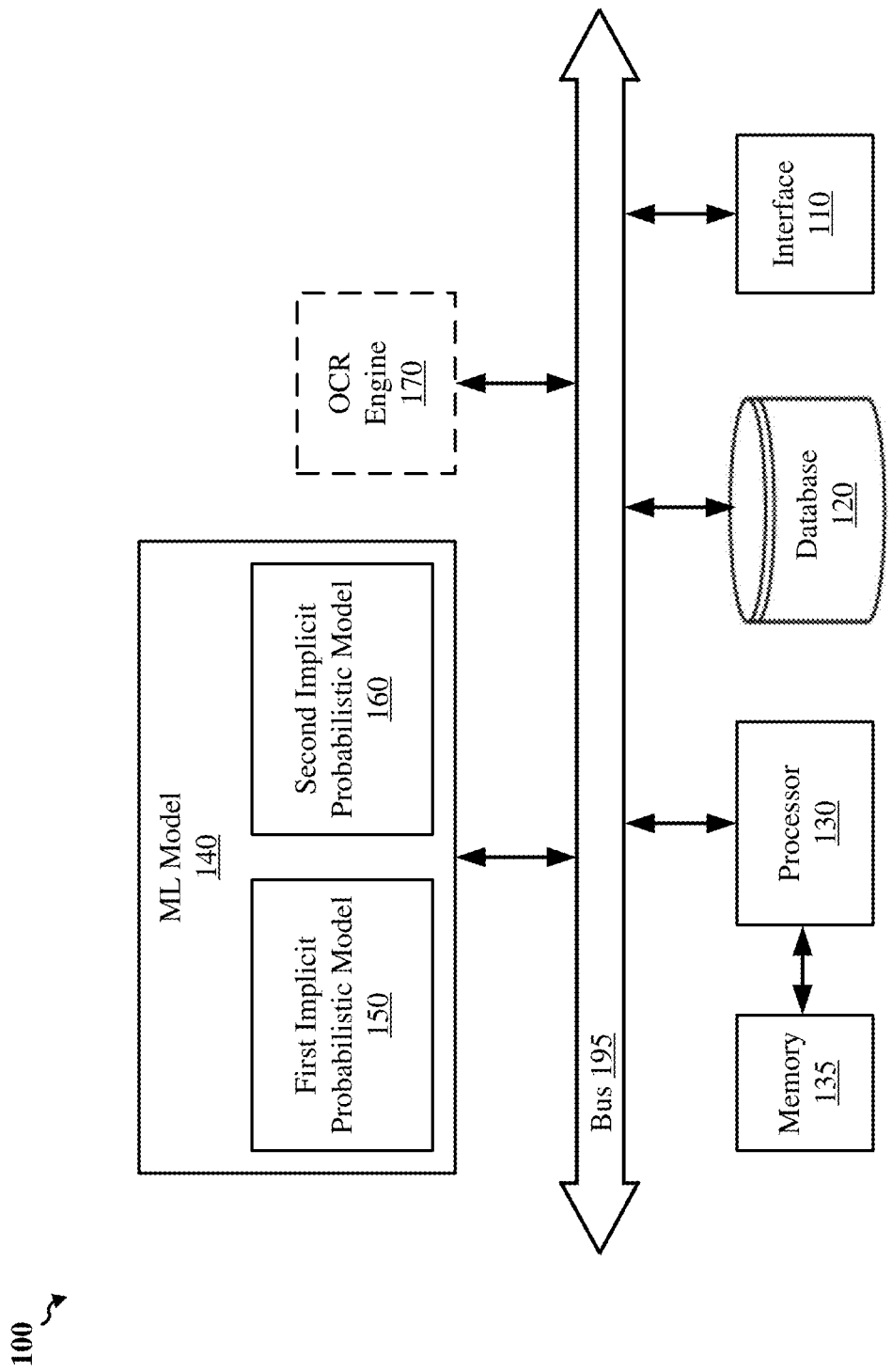
FIG. 1 shows an example computing system for document image enhancement, according to some implementations.

Implementations of the subject matter described in this disclosure is regarding electronic image enhancement, including a cycle-consistent diffusion model for document image enhancement. As used herein, a "document image" refers to an electronic copy of a document after scanning or otherwise optically capturing the paper document. An "electronic document" may refer to a document image or the document information after performing object character recognition (OCR) on the document image. To note, object character recognition may also be referred to as optical character recognition. An "OCR document" refers to the document information (such as including the text of the document in electronic format) as a result of performing OCR on a document image.

Various paper (or otherwise physical) documents are often degraded in various ways during the capture or scanning process. For example, document images may include noise, blurring, fading, watermarks, shadows, and more (with such document images of degraded quality being referred to as dirty images and the term dirty referring to degraded quality). Such degradations make the document difficult to read for OCR and can significantly impair the performance of OCR means. As such, automatic document processing is a first step before OCR to enhance document image quality using image processing techniques including denoising, restoration, and deblurring. However, directly applying such techniques to a document image may not generate the desired effect due to the unique challenges posed by text in the document image. For example, for typical image enhancement tasks, the degradation function is known and the task of recovering the image can be translated into an inverse problem to be solved, such as inpainting, deblurring/super-resolution, and colorization. In contrast, real-world document image enhancement (also referred to herein as document enhancement) is a blind denoising process with an unknown degradation function. In addition, typical image enhancement techniques for pictures or other non-text images focus on preserving content at the pixel level, but text image enhancement requires preserving content at the character level (which is an unknown bounding of multiple pixels per character). As such, current techniques do not consider critical character features, such as glyphs, resulting in character-glyph damage if the techniques are used for enhancement of document images.

Various document enhancement means that rely on assumptions and prior information regarding the degradation function have been proposed, but there is still a need for more effective techniques that can handle unknown degradation functions. Some methods of document enhancement for document images having unknown degradation functions have been based on deep learning, which led to the development of discriminative models based on convolution neural networks (CNNs) and auto-encoder (AE) architectures. For example, some methods have proposed using unpaired images (such as a dataset of dirty images and a corresponding dataset of clean images) for denoising based on generative models, such as generative adversarial networks (GANs), which transfer images from one domain to another while preserving content representation. In this manner, document denoising can be achieved by transferring from a dirty domain to a clean domain while preserving the text content. Training such models requires minimizing an adversarial loss between a specific pair of source and target datasets (such as from the dirty dataset to the clean dataset and/or the clean dataset to the dirty dataset of document images).

However, such methods require training data of dirty document images paired with their counterparts of clean document images, and obtaining dirty/clean pairs of the same document image may be difficult to obtain in real world applications or whose use may cause concerns. In particular, there may be data privacy concerns regarding the use of known pairs of clean documents and dirty documents for training, such as medical documents, financial documents, or other documents required to be kept confidential. As a result of such data privacy concerns, obtaining pairs of dirty documents and clean documents for training may be difficult as entities controlling such documents may be reluctant to provide those documents. In addition, there is no public dataset of sufficient document image pairs for training such models. For example, large generative models for image enhancement, including Stable diffusion, Dall-E, and Imagen, are attributed to large datasets for training, such as the LAION-5B dataset that includes clip filtered image/text pairs. Conversely, there is no readily available large dataset for document type image enhancement tasks, and as noted above, attempting to build such a dataset may raise data privacy concerns and is otherwise difficult.

Instead of obtaining document pairs for a training dataset, some have attempted to synthetically generate such datasets. A synthetic dataset includes clean images with synthetic noise added to the clean images to generate the dirty image counterparts of the document pairs. However, synthetic noise many times does not accurately represent real-world noise or degradation. As such, the synthetically generated training set is deficient in properly training models.

Another problem with current image enhancement models is that many models are trained to perform document enhancement for a specific domain (such as specifically for noise, specifically for shadows, or specifically for watermarks). Such models are trained using specific dirty/clean image pairs specific to the domain. While a smaller dataset having fewer image pairs may be required for training, such models have limited adaptability to different domains. For example, a model configured and trained for watermark removal may not perform well for denoising. Domain-specific training leads to a significant increase in the number of models required for document enhancement in different domains, and the increase in the number of models may make the overall document enhancement computationally prohibitive, especially where document images are high resolution.

Therefore, there is a need for a document enhancement model that does not require dirty/clean pairs of document images with the pairings known for training. There is also a need for the model to be flexible in the types and numbers of domains for enhancement. In addition, it would be beneficial if the model is an unsupervised end-to-end document level image translation/enhancement model that addresses the challenges faced by existing document enhancement models.

Various implementations of the subject matter disclosed herein provide one or more technical solutions to document image enhancement to improve OCR. For document enhancement, two separate models of a machine learning (ML) model are used to translate an electronic document image from a dirty (source) space to a clean (target) space. A computing system for document image enhancement implements the specific ML model. The ML model obtains an electronic document image, with the electronic document image being generated from scanning a physical document. The ML model also enhances the electronic document image. Enhancing the electronic document image includes translating the electronic document image in a source space to a latent space by a first implicit probabilistic model of the ML model, with the first implicit probabilistic model being trained based on translating electronic document images in the source space to the latent space. Enhancing the electronic document image also includes translating the electronic document image in the latent space to a target space by a second implicit probabilistic model of the ML model. The second implicit probabilistic model is trained independently from the first implicit probabilistic model, and the second implicit probabilistic model is trained based on translating electronic document images in the target space to the latent space. The electronic document image in the clean space is thus ready to have OCR performed.

Various aspects of the present disclosure provide a unique computing solution to a unique computing problem that did not exist prior to document scanning and OCR. The models to perform document enhancement cannot be performed in the human mind, much less using pen and paper. In addition, the translation of electronic documents between various spaces cannot be performed in the human mind, much less using pen and paper. As such, implementations of the subject matter disclosed herein are not an abstract idea such as organizing human activity or a mental process that can be performed in the human mind.

FIG. 1 shows an example computing system 100 for document enhancement, according to some implementations. The computing system 100 includes an interface 110, a database 120, a processor 130, a memory 135 coupled to the processor 130, and an ML model 140. The computing system 100 may also include an OCR engine 170. In some implementations, the various components of the system 100 may be interconnected by at least a data bus 195, as depicted in the example of FIG. 1. In other implementations, the various components of the system 100 may be interconnected using other suitable signal routing resources.

The interface 110 may be one or more input/output (I/O) interfaces to obtain electronic document images to be provided to the ML model 140 and for performing OCR. The interface 110 may also be configured to provide cleaned document images or OCR documents that are generated by the computing system 100 to another device or to a user. The interface 110 may also receive or provide inputs or outputs for continued operation of the computing system 100. An example interface may include a wired interface or wireless interface to the internet or other means to communicably couple with other devices. For example, the interface 110 may include an interface with an ethernet cable or a wireless interface to a modem, which is used to communicate with an internet service provider (ISP) directing traffic to and from other devices (such as a user's local computing system if system 100 is remote to a user). In this manner, a user device or another device may be used to upload electronic document images that were previously scanned and are in the source space. In some examples, the example interface 110 may include or communicably couple with a scanner (such as a flatbed scanner, a camera, or another suitable optical device) so that a physical document may be scanned, with the resulting electronic document image being received by the computing system 100 via the interface 110. In some implementations, the interface 110 may also include a display, a speaker, a mouse, a keyboard, or other suitable input or output elements that allow interfacing with a local user.

The database 120 may store the electronic document images in the dirty/source space to be provided to the ML model 140. The database 120 may also store the electronic document images in various states of processing (such as in the latent space or the clean/target space). In some implementations, the database 120 may further store (in a secure manner) document images of a training set used to train the ML model 140, any parameters of the ML model 140, or any other suitable information. For example, the database 120 may also store computer executable instructions or other data for operation of the computing system 100. In some implementations, the database 120 may include a relational database capable of presenting information as data sets in tabular form and capable of manipulating the data sets using relational operators. The database 120 may use Structured Query Language (SQL) for querying and maintaining the database 120.

The processor 130 of the computing system may include one or more suitable processors capable of executing scripts or instructions of one or more software programs stored in system 100 (such as within the memory 135). For example, the processor 130 may be capable of executing one or more applications, the ML model 140 (which may include the first implicit probabilistic model 150 and the second implicit probabilistic model 160), or the optional OCR engine 170. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processor 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications, the ML model 140 (which may include the first implicit probabilistic model 150 and the second implicit probabilistic model 160), or the optional OCR engine 170 that may be executed by the processor 130. The memory 135 may also store the images in various spaces, ML model 140 parameters, or any other data for operation of the ML model 140 or the system 100. In some implementations, hardwired circuitry may be used in place of, or in combination with, software instructions to implement aspects of the disclosure.

The ML model 140 translates electronic document images from a dirty space (also referred to as a source space) to a clean space (also referred to as a target space). As used herein, "electronic document image" and "document image" are used interchangeably. In translating a document image, the ML model 140 enhances the document image by reducing or removing various deformations that may occur during scanning or that may exist in the physical document itself.

Figure 2:
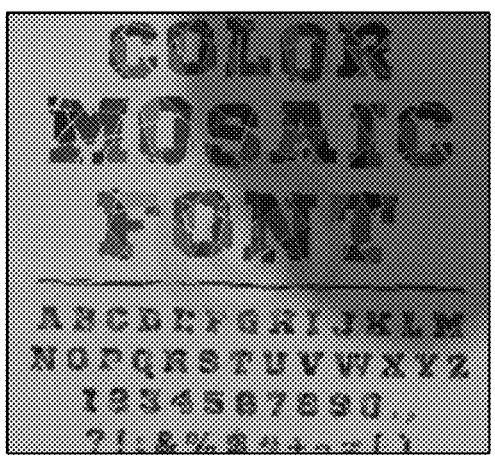
FIG. 2 shows example deformations that may occur in an electronic document image.
Figure 2:
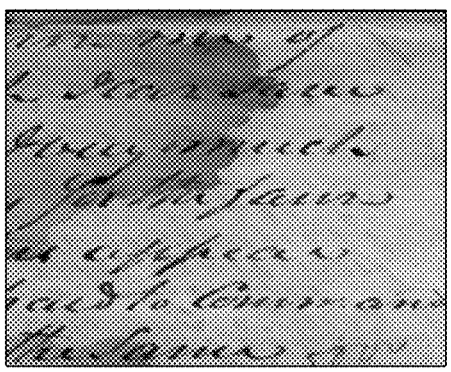

FIG. 2 shows example deformations that may occur in an electronic document image. Image 200 includes a watermark that may occur in an electronic document image if the physical document that is scanned is watermarked. Image 210 includes noise that may occur in an electronic document image if the physical document is wrinkled or is otherwise deformed during scanning. Image 220 includes a shadow that may occur in an electronic document image based on objects blocking light on the physical document during scanning. Image 230 includes blur (which includes blurry text) that may occur in an electronic document image if the focal length of the scanner's optics is incorrect during scanning. Image 240 includes fade (which includes faded text) that may occur in an electronic document image if the objects in the physical document are lightly shaded or otherwise not dark enough for scanning. Image 250 includes various shading that may occur in an electronic document image if the physical document is naturally discolored, shaded, or otherwise not just black and white. The ML model 140 may be configured to reduce or remove these deformations. In some implementations, the ML model 140 may also reduce or remove other deformations, such as the physical document or text being slightly tilted or rotated during scanning or the electronic document image being warped as a result of scanning the physical document.

Referring back to FIG. 1, the ML model 140 includes a first implicit probabilistic model 150 and a second implicit probabilistic model 160. The first implicit probabilistic model 150 translates the electronic document image in a source space (i.e., the dirty document image received by the ML model 140) to a latent space. The second implicit probabilistic model 160 then translates the electronic document image in the latent space to a target space (i.e., generating the clean document image in the clean space). Each implicit probabilistic model is based on a deterministic function to translate a document image from the source space to the latent space or to translate a document image from the target space to the latent space.

The latent space is a common space to join the first implicit probabilistic model 150 and the second implicit probabilistic model 160, thus allowing the ML model 140 to use the two models 150 and 160 to perform document enhancement and thus translate a document image from the dirty space to the clean space. In some implementations, the latent space may be concealed by the computing system 100 (such as the ML model 140). However, in some implementations, information regarding the document images or the document images themselves in the latent space may be provided to other devices or components (such as to be stored in the database 120 or to be processed by another device). To note, "domain" and "space" may be used interchangeably herein, such as "latent domain" and "latent space," "source domain" and "source space," and "target domain" and "target space."

In training the two implicit probabilistic models 150 and 160, the first implicit probabilistic model 150 is trained based on translating electronic document images in the source space to the latent space. As such, the first implicit probabilistic model 150 may include a first probabilistic function to be configured for translating from the source space to the latent space. The second implicit probabilistic model 160 is trained based on translating electronic document images in the target space to the latent space. As such, the second implicit probabilistic model 160 may include a second probabilistic function to be configured for translating from the target space to the latent space. For the second implicit probabilistic model 160 to translate from the latent space to the target space, the second implicit probabilistic model 160 may perform the inverse of the second probabilistic function.

As noted above, typical training of any models required training data including known pairs of dirty document images and corresponding clean document images. Thus, even if a model was divided into a plurality of models (such as a sequence of models with one model to reduce or remove one type of deformation depicted in FIG. 2), training of the models are dependent on one another in order for the entire model to be properly trained to translate from the source space for the source document images in the training data to the target space for the corresponding target document images in the training data.

However, for the ML model 140 of the computing system 100, the second implicit probabilistic model 160 is trained independently from the first implicit probabilistic model 150. Thus, while the function of the first implicit probabilistic model 150 is configured for translating document images from the source space to the latent space, the function of the second implicit probabilistic model 160 is configured separately for translating document images from the target space to the latent space. As such, the dirty document images in the source space of the training data may be processed for training the first implicit probabilistic model 150 without accessing the clean document images in the target space of the training data. Similarly, the clean document images in the target space of the training data may be processed for training the second implicit probabilistic model 160 without accessing the dirty document images in the source space of the training data. In this manner, knowing the pairings between dirty and clean images in the training data is not required, and data privacy may be maintained by only needing to process one end of the training data at a time.

To be able to decouple training of the first implicit probabilistic model 150 and the second implicit probabilistic model 160, in some implementations, the implicit probabilistic models 150 and 160 are diffusion models. In general, diffusion models are a family of generative models that may be used for image editing, composition, and restoration, with examples of such models including Stable Diffusion, DALL-E 2, and Imagen.

Diffusion models attempt to model a distribution p(x) by approximating the data distribution q(x) through diffusion and reversed generative processes. The above examples Stable Diffusion, DALL-E 2, and Imagen are built on the foundation of diffusion models, including score-based models that match with Langevin dynamics and denoising diffusion probabilistic models (DDPMs) that parameterize the variational lower bound (also referred to as the evidence lower bound or ELBO) with a Gaussian distribution. However, such models rely on joint training by leveraging both dirty images and corresponding clean images directly (with the pairing known between the images) in training data. As noted above, such joint leveraging/access to dirty images and their corresponding clean images in the training data raise privacy concerns as well as may create difficulties in creating a sufficient size training data. In addition, the example models focus on picture type images, such as photographs, paintings, etc.

In contrast, the diffusion models of the ML model 140 are separate, pretrained diffusion models (thus not relying on joint training) for document image translation (with the document images including text). As such, the first implicit probabilistic model 150 is a domain-specific diffusion model including a first deterministic diffusion to translate between the source space and the latent space, and the second implicit probabilistic model 160 is a domain-specific diffusion model including a second deterministic diffusion to translate between the target space and the latent space. The first deterministic diffusion and the second deterministic diffusion are configured independently, thus allowing only the document images in the source space or the document images in the target space of the training data to be accessed at one time when training the ML model 140. As such, the diffusion models of the ML model 140 performs document enhancement via unpaired image translation, with the first diffusion model translating a document image from the source space to the latent space and the second diffusion model translating the document image from the latent space to the target space.

Figure 3:
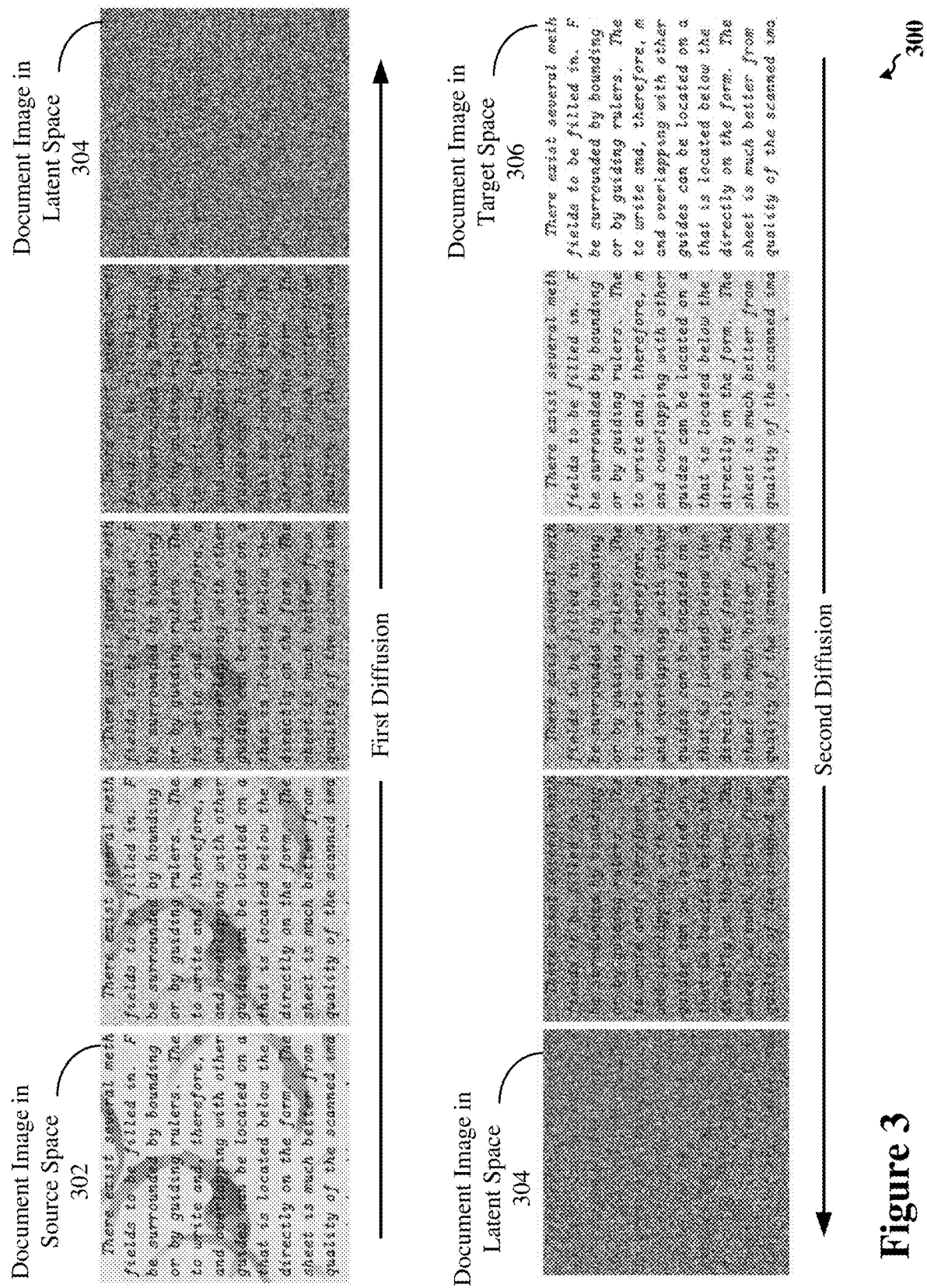
FIG. 3 shows an example sequence of images from an iterative denoising of a document image between a source domain, a latent domain, and a target domain.

For the diffusion models of the ML model 140, instead of the latent space being a simplified space (such as based on Gaussian distributions, such as for generative adversarial networks (GANs) or variational autoencoders (VAEs)) to unify the latent space between the two models, the diffusion models may be configured to gradually denoise or noise document images from the source space or the target space, respectively, to reach a common latent space. FIG. 3 shows an example sequence of images 300 of an iterative denoising of a document image between a source space, a latent space, and a target space. For training the diffusion models, iterations of denoising the document image in the source space (302) are performed based on the first diffusion of the first diffusion model until the document image in the latent space (304) is generated. Conversely, iterations of "noising" the document image in the target space (306) are performed based on the second diffusion of the second diffusion model until the document image in the latent space (304) is generated. In this manner, the document images in the source space are denoised and the document images in the target space are noised until approximately common document images are generated based on the first diffusion and the second diffusion. Thus, for denoising after training, the first diffusion model and the second diffusion model are unpaired from each other, with the first diffusion model generating the document image in the latent space from a document image in the source space based on the first diffusion and the second diffusion model generating the document image in the target space from the document image in the latent space based on an inverse of the second diffusion.

To note, from a computer vision perspective, document enhancement can be interpreted as document-level image-to-image translation. For unpaired document enhancement from a dirty space to a target space (with two separate, independent diffusion models of the ML model 140 performing the document enhancement), the unpaired document enhancement may be represented mathematically, as described below. The training data includes two unpaired sets of document images. One set includes dirty document images (which may also be referred to as degraded document images) from the source space X, and the other set includes clean document images from the target space Y. The dirty document images from the source space X may include any type and number of degradations, such as those degradations depicted in FIG. 2. The objective of document enhancement is to learn a mapping F: X→Y such that the output ŷ=F(x) for x∈X is indistinguishable from document images y∈Y to classify ŷ apart from y. The mapping F is to satisfy two conditions: preserve the content and transfer the style occurring in the document images y. The content of a document image refers to the character, text, numbers, tables, and figures in the document image. Style transfer refers to the translation from dirty documents in the source space X to clean documents in the target space Y. As such, the objective of document enhancement is to convert the dirty document images from the source space X while preserving the core contents of the document images that appear in the clean document images in the target space Y.

In some implementations, the implicit probabilistic models 150 and 160 are cycle consistent (thus having no or minimal differences between corresponding datapoints after sequentially performing a forward mapping and a reverse mapping). A model being cycle consistent may refer to the model having no or minimal cycle consistency loss, such as defined for generative adversarial networks (GANs). Thus, the first implicit probabilistic model 150 includes a first cycle consistent model to translate an electronic document image between the source space and the latent space, and the second implicit probabilistic model 160 includes a second cycle consistent model to translate the electronic document image between the latent space and the target space. With the models being cycle consistent and for the models 150 and 160 to be configured and trained independently, the operations performed by the models 150 and 160 may be reversible. In particular, the second diffusion of the second diffusion model is for translating clean document images in the target space Y to the latent space, and the second diffusion model is to perform the inverse of the second diffusion to translate document images from the latent space to the target space Y. If the models are cycle consistent, the inverse of the diffusions may be performed with no or minimal loss occurring.

Figure 4:
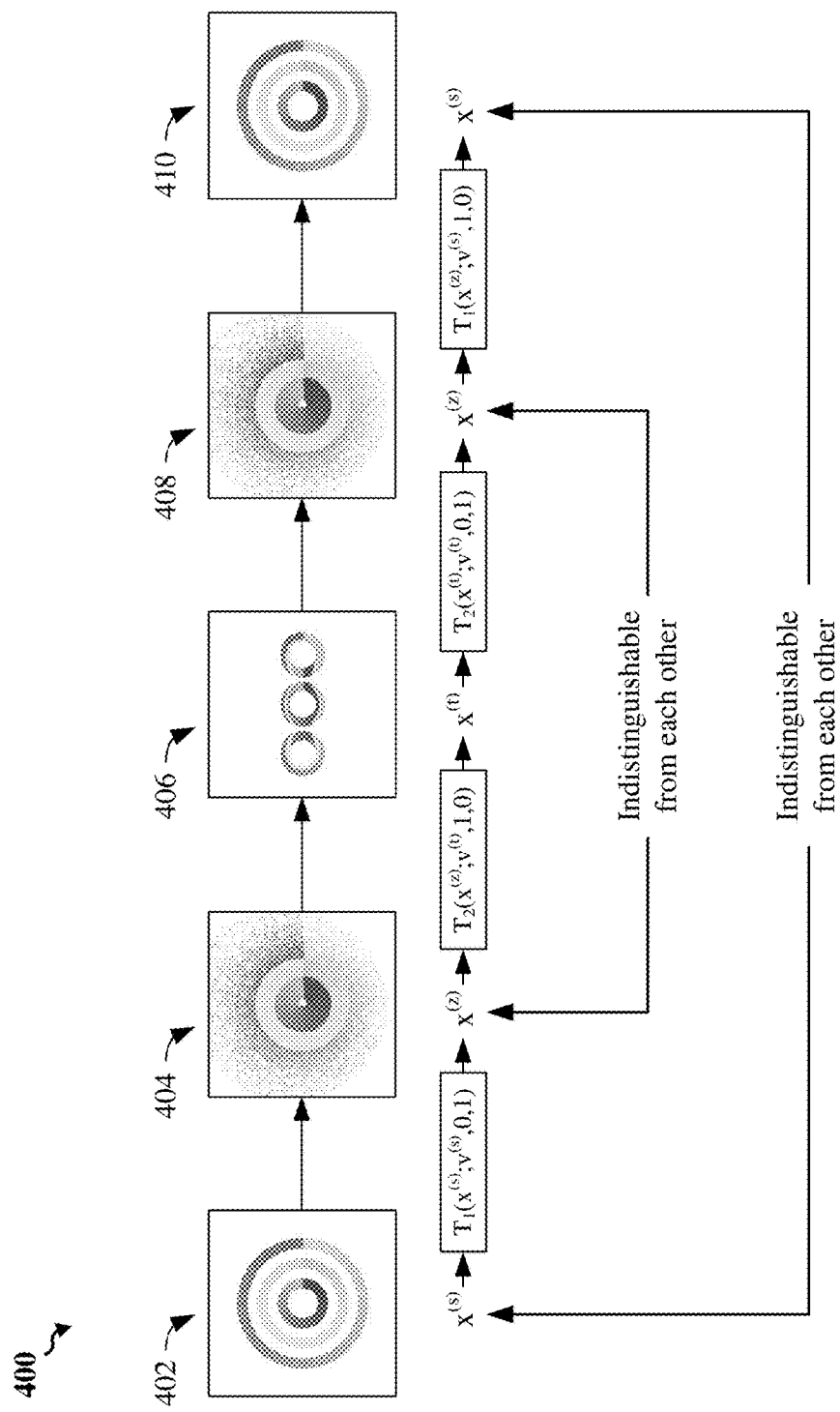
FIG. 4 shows an illustration of translation from the source domain to the target domain and back to the source domain by cycle consistent models.

FIG. 4 shows an illustration 400 of translation from the source space to the target space and back to the source space by cycle consistent models. In the illustration 400, the image is translated from the source space to the target space by two cycle consistent models and translated back to the source space by the inverse of the two cycle consistent models. The two cycle consistent models are example implementations of the models 150 and 160 of the ML model 140.

The original image is first in the source space, as represented by $x^{(s)}$, with x representing the image and (s) representing the source space in which the image is included. Translation of $x^{(s)}$ to an image in the latent space (which is represented as $x^{(z)}$, with (z) representing the latent space) is performed by the first cycle consistent model (such as model 150), and is represented by $T_1$. $T_1$ may be performed via direct sampling of $x^{(s)}$. The indicated parameters to the $T_1$ function include the image provided to the model ($x^{(s)}$), the diffusion with the $T_1$ function for translation ($v^{(s)}$), and the direction of the $T_1$ function (with 0,1 indicating a forward operation of the diffusion). As such, $T_1(x^{(s)};v^{(s)},0,1)$ by the model 150 translates the image at 402 to the image at 404 (which is in the latent space).

Translation of $x^{(z)}$ to an image in the target space (which is represented as $x^{(t)}$, with (t) representing the target space) is performed by the second cycle consistent model (such as model 160), and is represented by $T_2$. $T_2$ may be performed via reverse sampling of $x^{(z)}$. The indicated parameters to the $T_2$ function include the image provided to the model ($x^{(z)}$), the diffusion with the $T_2$ function for translation ($v^{(t)}$), and the direction of the $T_2$ function (with 1,0 indicating a reverse operation of the diffusion). As noted above, the diffusion of the model 160 is configured to translate from the target space to the latent space. As such, $T_2(x^{(z)};v^{(t)},1,0)$ by the model 160 performs the reverse translation of an image, thus translating the image at 404 to the image at 406 (which is in the target space). In translating the image at 406 (which is in the target space) back to the source space, the $T_2$ and $T_1$ functions are applied in inverse order. As such, the model 160 performs $T_2(x^{(t)};v^{(t)},0,1)$ on the image at 406 to generate the image at 408 (which is in the latent space), and the model 150 performs $T_1(x^{(z)};v^{(s)},1,0)$ on the image at 408 to generate the image at 410 (which is in the source space).

To represent cycle consistency of the models for document enhancement for FIG. 4 mathematically, given $x^{(s)}$ from source space X, trained source model $v^{(s)}$, and trained source model $v^{(t)}$, forward cycle consistency is defined as in equations (1) and (2) below:

$$x^{(z)}=T_1(x^{(s)};v^{(s)},t_0,t_1) \qquad (1)$$

$$x^{(z)}=T_2(x^{(z)};v^{(t)},t_1,t_0) \qquad (2)$$

Backward cycle consistency is defined as in equations (3) and (4) below:

$$\tilde{x}^{(z)}=T_2(x^{(t)};v^{(t)},t_0,t_1) \qquad (3)$$

$$\tilde{x}^{(s)}=T_1(x^{(z)};v^{(s)},t_1,t_0) \qquad (4)$$

$\tilde{x}^{(z)}$ indicates the image generated by the model 160 performing $T_2$ ($x^{(t)}$; $v^{(t)}$, $t_0$, $t_1$), which is to be the same as $x^{(z)}$. $\tilde{x}^{(s)}$ indicates the image generated by the model 150 performing $T_1(\tilde{x}^{(z)};v^{(s)},t_1,t_0)$, which is to be the same as $x^{(s)}$. Since the models are cycle consistent, the image at 402 is to be indistinguishable from the image at 410 (with the cycle consistency loss between the images being zero or negligible). Similarly, the image at 404 is to be indistinguishable from the image at 408 (with the cycle consistency loss between the images being zero or negligible).

For cycle-consistent diffusion models, stochastic differential equations (SDEs) may be leveraged to represent the diffusions. As such, a forward and backward SDE may be used to mathematically describe the general diffusion process, depicted in equation (5) below, and the reversed generative process, depicted in equation (6) below:

$$dx=f(x,t)dt+g(t)dw \qquad (5)$$

$$dx=[f-g^2\nabla_x \log p_t(x)]+g(t)dw \qquad (6)$$

f(x,t) is a vector-valued coefficient, w is a standard Wiener process, g(t) is a diffusion coefficient, and $\nabla_x \log p_t(x)$ is a score function of a noise perturbed data distribution.

The diffusion process may be represented by an ordinary differential equation (ODE), such as a deterministic ODE named the probability flow (PF) ODE. A PF ODE enables uniquely identifiable encodings of data for the diffusion process. In some implementations, the first cycle consistent model 150 is a diffusion model based on solving a first ODE for translating electronic document images between the source space and the latent space, and the second cycle consistent model 160 is a diffusion model based on solving a second ODE for translating electronic document images between the target space and the latent space.

A type of diffusion model is a denoising diffusion implicit model (DDIM). A DDIM accelerates DDPM inference via non-Markovian processes. DDIMs are described in detail in the conference paper "Denoising diffusion implicit models," by Jiaming Song, Chenlin Meng, and Stefano Ermon and published at the International Conference on Learning Representations (ICLR), 2021, which is incorporated by reference herein. The DDIMs of the ML model 140 in comparison are configured to enhance document images including content instead of pure images. In some implementations, the first cycle consistent model 150 is a DDIM based on solving a first ODE for translating electronic document images between the source space and the latent space, and the second cycle consistent model 160 is a DDIM based on solving a second ODE for translating electronic document images between the target space and the latent space. A document image in the latent space may refer to latent variables (also referred to as latent points) generated from translating a document image from either the source space or the target space to the latent space. As such, the model 150 may generate the latent variables $x^{(z)}$ via reverse sampling of $x^{(s)}$, and the model 160 may ingest the latent variables $x^{(z)}$ to generate the document image in the target space ($x^{(t)}$) via direct sampling.

The equivalent ODE of the forward SDE depicted in equation (5) above is depicted in equation (7) below:

$$dx = \left[ f(x, t) - \frac{1}{2}g(t)^2 \nabla_x \log p_t(x) \right] dt \qquad (7)$$

A θ-parameterized score network $s_{t,\theta}$ is used to approximate the score function $\nabla_x \log p_t(x)$, a θ-parameterized model $v_\theta$ (which equals dx/dt) is used to denote a model v, and $S_{ODE}$ is used to denote the ODE based translation of x between spaces (such as between the source and the latent spaces or between the latent and the target spaces, which is depicted generally as a mapping from $x^{(t_0)}$ to $x^{(t_1)}$). As such, the algorithm that may be implemented by the ML model 140 for mapping from $x^{(t_0)}$ to $x^{(t_1)}$ based on an ODE is depicted in equation (8) below:

$$x^{(t_1)}=S_{ODE}(x^{(t_0)};v_\theta,t_0,t_1)=x^{(t_0)}+\int_{t_0}^{t_1} v_\theta(t,x^{(t)})dt \qquad (8)$$

As such, if the models 150 and 160 include DDIMs based on solving ODEs for encoding, the generative sampling process for translation is defined in a deterministic non-Markovian manner, which can be used in a reverse direction to deterministically noise an image to obtain the initial noise vector.

Referring back to FIG. 4, if the first implicit probabilistic model 150 includes a first DDIM based on solving a first ODE for encoding the electronic document image from the source space to the latent space, translation $T_1(x^{(s)};v^{(s)},0,1)$ is implemented as $S_{ODE}(x^{(s)};v_\theta^{(s)},0,1)$, and translation $T_1(x^{(z)};v^{(s)},1,0)$ is implemented as $S_{ODE}(x^{(z)};v_\theta^{(s)},1,0)$. If the second implicit probabilistic model 160 includes a second DDIM based on solving a second ODE for encoding the electronic document image from the target space to the latent space, translation $T_2(x^{(z)};v^{(t)},1,0)$ is implemented as $S_{ODE}(x^{(z)};v_\theta^{(t)},1,0)$, and translation $T_2(x^{(t)};v^{(t)},0,1)$ is implemented as $S_{ODE}(x^{(t)};v_\theta^{(t)},0,1)$.

To note, $S_{ODE}$ has reasonably small discretization errors such that any cycle consistency loss is negligible. As such, the first DDIM and the second DDIM are cycle consistent models. Since the first DDIM and the second DDIM are cycle consistent models, the forward cycle consistency defined in equations (1) and (2) above and the backward cycle consistency defined in equations (3) and (4) above may be defined in terms of an ODE based mapping as in equations (9) through (12) below:

$$x^{(z)} = S_{ODE}(x^{(s)}; v_\theta^{(s)}, t_0, t_1) \quad (9)$$

$$x^{(t)} = S_{ODE}(x^{(z)}; v_\theta^{(t)}, t_1, t_0) \quad (10)$$

$$\tilde{x}^{(z)} = S_{ODE}(x^{(t)}; v_\theta^{(t)}, t_0, t_1) \quad (11)$$

$$\tilde{x}^{(s)} = S_{ODE}(x^{(z)}; v_\theta^{(s)}, t_1, t_0) \quad (12)$$

As noted above, to allay data privacy concerns, training of the second implicit probabilistic model 160 is to be independent of training the first implicit probabilistic model 150. If the first implicit probabilistic model 150 includes a first DDIM based on solving a first ODE (which is the source model $v_\theta^{(s)}$) and the second implicit probabilistic model 160 includes a second DDIM based on solving a second ODE (which is the target model $v_\theta^{(t)}$), $v_\theta^{(s)}$ and $v_\theta^{(t)}$ are decoupled and to be trained independently. Through such independent training of the two models, the source datasets $x \in X$ and target datasets $y \in Y$ of the training data are kept private with reference to each other. For example, training the first implicit probabilistic model and the second implicit probabilistic model includes processing only one of the first set of document images or the second set of document images at one time while preventing the other set of document images from being accessed. More specifically, the source datasets $x \in X$ may be used in training $v_\theta^{(s)}$ independently from the target datasets $y \in Y$ being used to train $v_\theta^{(t)}$.

With the source and target diffusion models being trained independently, the document enhancement performed by the ML model 140 may be performed in a privacy sensitive manner. For example, a first entity may be the owner or in possession of the document images in the source space, and a second entity may be the owner or in possession of the document images in the target space. The first entity may wish to keep the source space document images private while still translating the document images to the target space. In addition, the second entity may wish to keep the target space document images private while still translating the document images to the target space. The first entity may have a computing system to implement the source diffusion model 150, and the second entity may have a computing system to implement the target diffusion model 160. The source diffusion model 150 is trained on the source data to encode document images in the source space into the latent space, and the target diffusion model 160 is trained on the target data to encode document images in the latent space to the target space. As such, the entire document enhancement process stretched across the two entities would require information regarding only the latent document images to be shared between the entities. To note, document images in the latent space may be sufficiently anonymized (such as no text or other content being decipherable without having the target diffusion model 160 translate to the target space or the source diffusion model 150 translate to the source space.

Referring back to FIG. 1, while the ML model 140 is depicted as a single components of the computing system 100 in FIG. 1, the ML model 140 may be divided into more components that may be distributed across any number of computing systems. As such, a computing system as used herein may refer to one or more computing systems, which may be in a distributed manner, to implement the components of the computing system 100 (such as the ML model 140 and the optional OCR engine 170).

Performing document enhancement by the ML model to generate a document image in the target space from a document image in the source space may be in preparation of performing OCR on the document image. As such, the electronic document image in the target space may be provided for an OCR engine to perform OCR. If the OCR engine is separate from the computing system 100 (such as being implemented on a different device), the document image may be provided via the interface 110 to the device implementing the OCR engine. In some implementations, the computing system 100 also includes an OCR engine 170 to perform OCR on the electronic document image in the target space in order to generate an OCR document. To note, any suitable OCR models may be implemented for the OCR engine 170.

The ML model 140 and the optional OCR engine 170 of the computing system 100 may be implemented in any suitable manner. For example, the ML model 140 and the optional OCR engine 170 may be included in software including instructions stored in memory 135 or the database 120, may include application specific hardware (e.g., one or more ASICs), or a combination of the above. If the components are implemented in software, the components may be implemented using any suitable computer-readable language. For example, each of the components may be programmed in the Python programming language using any suitable libraries. As noted above, while the components are depicted in FIG. 1 as part of one system 100, in other implementations, components of the system 100 may be distributed across multiple devices. As such, the particular architecture of the system 100 shown in FIG. 1 is but one example of a variety of different architectures within which aspects of the present disclosure may be implemented. Thus, while the examples herein are described with reference to system 100, any suitable system may be used to perform the operations described herein.

Figure 5:
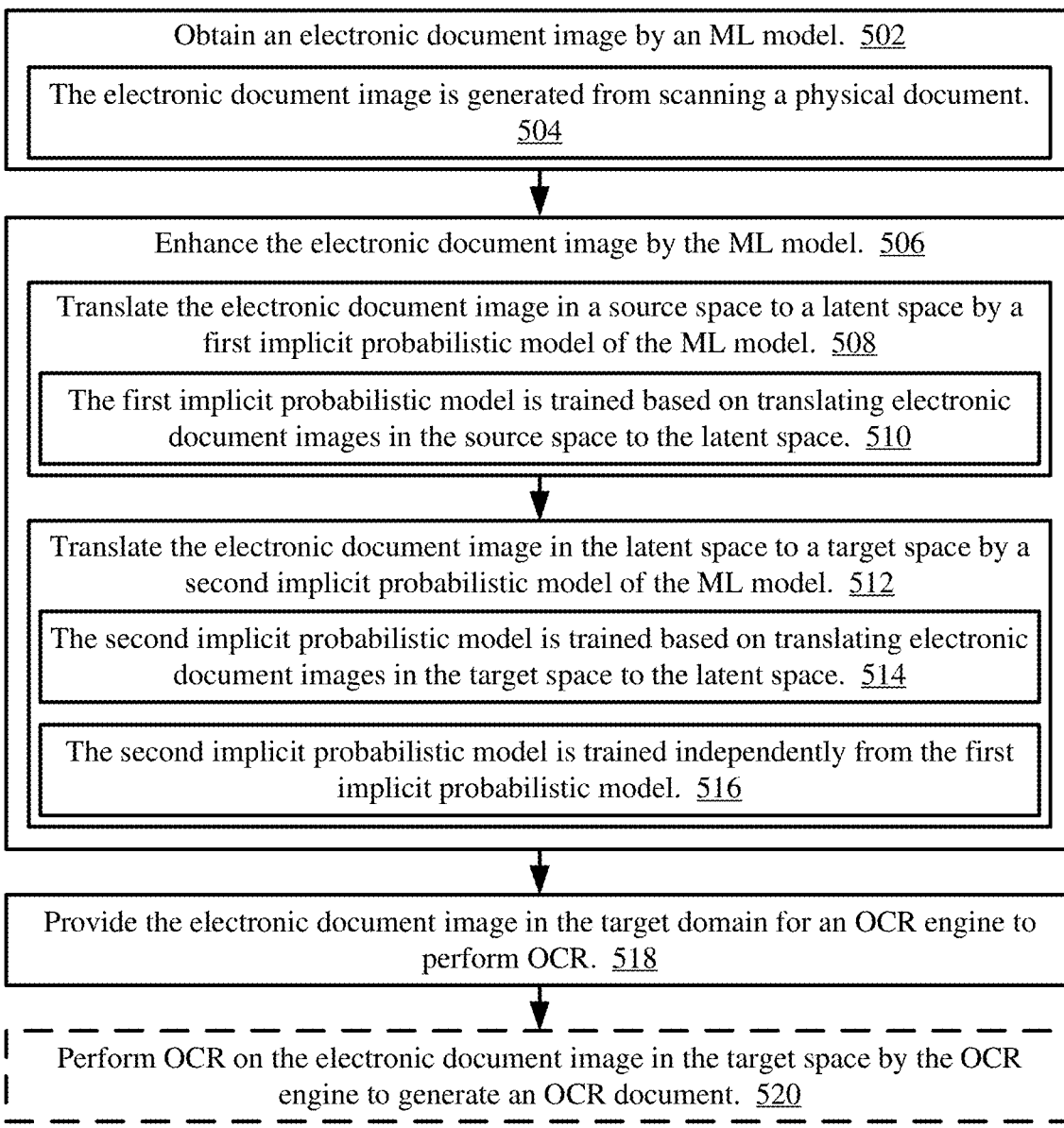
FIG. 5 shows an illustrative flow chart depicting an example operation of document enhancement, according to some implementations.

FIG. 5 shows an illustrative flow chart depicting an example operation 500 of document enhancement, according to some implementations. The example operation 500 is described herein as being performed by the computing system 100 in FIG. 1, but any suitable system may be used to perform the example operation. As depicted in the example operation 500, document enhancement refers to translating an electronic document image from a source (dirty) space to a target (clean) space.

At 502, the ML model 140 of the computing system 100 obtains an electronic document image. The electronic document image is generated from scanning a physical document (504). For example, a scanner may scan the physical document to generate an electronic document image, and the electronic document image may be received by the interface 110 of the computing system 100. The ML model 140 may receive the electronic document image from the interface 110, or the electronic document image may be stored on the computing system 100 (such as in the database 120 or another suitable memory), with the ML model 140 later retrieving the electronic document image.

At 506, the ML model 140 enhances the electronic document image. As described herein, document enhancement includes translating the electronic document image from a source (dirty) space to a target (clean) space. Performing such document enhancement includes reducing or removing distortions while preserving the content of the electronic document image. As noted above, document enhancement processes may include removing noise, shadows, watermarks, blur, fade, or warpage. Other document enhancement processes may include binarization (thus making the document image in the target space a binary image).

As noted above, translating the electronic document image from a source (dirty) space to a target (clean) space includes a first encoding of the electronic document image from the source space to a latent space (in which the document content is anonymized but the encoding is still unique to the document image)) and a second encoding of the electronic document image from the latent space to the target space (in which the electronic document image is clean).

As such, enhancing the electronic document image includes translating the electronic image that is in a source space to a latent space by a first implicit probabilistic model 150 of the ML model 140 (508). The first implicit probabilistic model 150 is trained based on translating electronic document images in the source space to the latent space (510). As noted above, the first implicit probabilistic model 150 may include a first cycle consistent model to translate the electronic document image between the source space and the latent space. As such, the first implicit probabilistic model 150 may be used to translate from the source space to the latent space and back to the source space with negligible cycle consistency loss. In some implementations, the first cycle consistent model 150 includes a first DDIM based on solving a first ODE for encoding the electronic document image from the source space to the latent space (such as based on the function in equation (8) above).

Enhancing the electronic document image also includes translating the electronic image that is in the latent space to a target space by a second implicit probabilistic model 160 of the ML model 140 (512). The second implicit probabilistic model 160 is trained based on translating electronic document images in the target space to the latent space (514). As noted above, the second implicit probabilistic model 160 may include a second cycle consistent model to translate the electronic document image between the target space and the latent space. As such, the second implicit probabilistic model 160 may be used to translate from the target space to the latent space and back to the target space with negligible cycle consistency loss. With the model being cycle consistent, the second cycle consistent model 160 is configured to reverse the function of translating a target space document image to a latent space document image in order to translate the electronic document image in the latent space to the target space. In some implementations, the second cycle consistent model 160 includes a second DDIM based on solving a second ODE for encoding the electronic document image from the target space to the latent space.

The second implicit probabilistic model 160 is trained independently from the first implicit probabilistic model 150 (516). For example, a training data is used to train the first implicit probabilistic model 150 and the second implicit probabilistic model 160, and the training data includes a first set of document images in the source space and a second set of document images in the target space. Training the first implicit probabilistic model 150 and the second implicit probabilistic model 160 may include processing only one of the first set of document images or the second set of document images at one time while preventing the other set of document images from being accessed. For example, the first set of document images in the source space may be used to train the first DDIM 150, and the second set of document images in the target space may be used to independently train the second DDIM 160.

With the electronic document image translated to the target space, the computing system 100 provides the electronic document image in the target space for an OCR engine to perform OCR (518). For example, if the OCR engine is external to the system 100, the document image may be provided via the interface 110 to another device implementing the OCR engine. In some implementations, the computing system 100 may include an OCR engine 170. In such implementations, the OCR engine 170 of the computing system 100 may perform OCR on the electronic document image in the target space to generate an OCR document (520).

Referring back to the document enhancement portion of operation 500 (i.e., the translation of a document image from the source space to the target space as in blocks 508 and 512), the algorithm for translation of the electronic document image (i.e., the functioning of the ML model 140 including the models 150 and 160) may be implemented in software using the following steps, provided the following: the document image to be translated is from the source space, with $x^{(s)} \sim p_s(x)$; the trained source model $v_\theta^{(s)}$ is defined; the trained target model $v_\theta^{(t)}$ is defined; and $t_0$ and $t_1$ are given. Step 1 is encoding the document image in the source space to the latent space. Thus, the model 150 obtains a latent embedding from the document image $x^{(s)}$ to generate the document image in the latent space ($x^{(z)}$) via $x^{(z)} = S_{ODE}(x^{(s)}; v_\theta^{(s)}, t_0, t_1)$. Step 2 is decoding the document imaged in the latent space ($x^{(z)}$) to the target space. Thus, the model 160 obtains a target space document image ($x^{(t)}$) reconstructed from the latent space document image $x^{(z)}$ via $x^{(t)} = S_{ODE}(x^{(z)}; v_\theta^{(t)}, t_1, t_0)$. Step 3 includes returning $x^{(t)}$ (i.e., the ML model 140 outputting the generated document image in the target space). To note, the algorithm may be coded in any suitable programming language or otherwise suitably implemented on the computing system 100.

As noted above, training data including a first set of source space document images and a second set of target space document images is used to train the models 150 and 160 of the ML model 140 (such as model $v_\theta^{(s)}$ and model $v_\theta^{(t)}$ in the above examples). However, the datasets of the training data may not be large enough to sufficiently train the models. For example, existing document benchmark datasets are not large enough for diffusion model training. In another example, if document images including sensitive content are used for training, the entity possessing such images may restrict the corpus of document images to be used to a limited amount that is insufficient for training on its own.

To ensure the datasets of the training data are of sufficient size, training the first implicit probabilistic model 150 and the second implicit probabilistic model 160 of the ML model 140 includes performing data augmentation on the first set of document images and on the second set of document images.

Data augmentation is a means of artificially increasing the size of the training datasets by creating modified copies of objects in the dataset, and the size increase may be many fold as compared to the original dataset. For example, data augmentation may be performed on a set of four source space document images to generate tens, hundreds, or even thousands of additional source space document images.

Typical data augmentation techniques include rotating, flipping, or otherwise distorting an image. As such, those typical data augmentation techniques are suitable for photographs or other pictorial images. However, such data augmentation techniques may not be suitable for document images including text or other content. For example, rotating or flipping a document image may affect the ability to recognize the text characters in the document image.

To overcome such issues of typical data augmentation techniques, data augmentation that is performed on the training data for the models 150 and 160 may include windowing techniques to increase the training data size. In general, windowing includes dividing a document image into a plurality of smaller document images. In windowing, a window of a defined size may be placed on a document image to indicate the portion of the document image to be copied as a new document image (thus cropping the portions of the document image outside of the window for the new document image). To note, document images may be of high resolution. For example, most basic document scanners scan at a minimum of 300 dots per inch (DPI). Thus, for a letter size document (8 inches×11 inches) that is scanned, the resolution of the document image may be a minimum resolution of 2400×3300. A document image of resolution 2400×3300 may be used to generate a plurality of smaller resolution document images, with each generated document image being a windowed portion of the original document image. To note, smaller document images generated via windowing are referred to herein as sub-images. Two windowing techniques to generate sub-images include sub-windowing and slide-windowing, which are described in more detail below.

In some implementations, a system performing data augmentation on the first set of document images and on the second set of document images includes the system performing sub-windowing on one or more of the document images in the first set of document images and the second set of document images to generate additional document images. Sub-windowing includes dividing a high-resolution document image into a plurality of sub-images that neighbor one another in the high-resolution document image. In an example of sub-windowing, a 1024×1024 resolution document image may be divided into 16 sub-images of 256×256 resolution, or may be divided into 64 sub-images of 128× 128 resolution. In the examples, the high-resolution document image would thus consist of 4 rows×4 columns of sub-images of 256×256 resolution or of 8 rows×8 columns of sub-images of 128×128 resolution. As such, a dataset of four document images may be augmented to include 64 or 256 sub-images in the examples.

Figure 6:
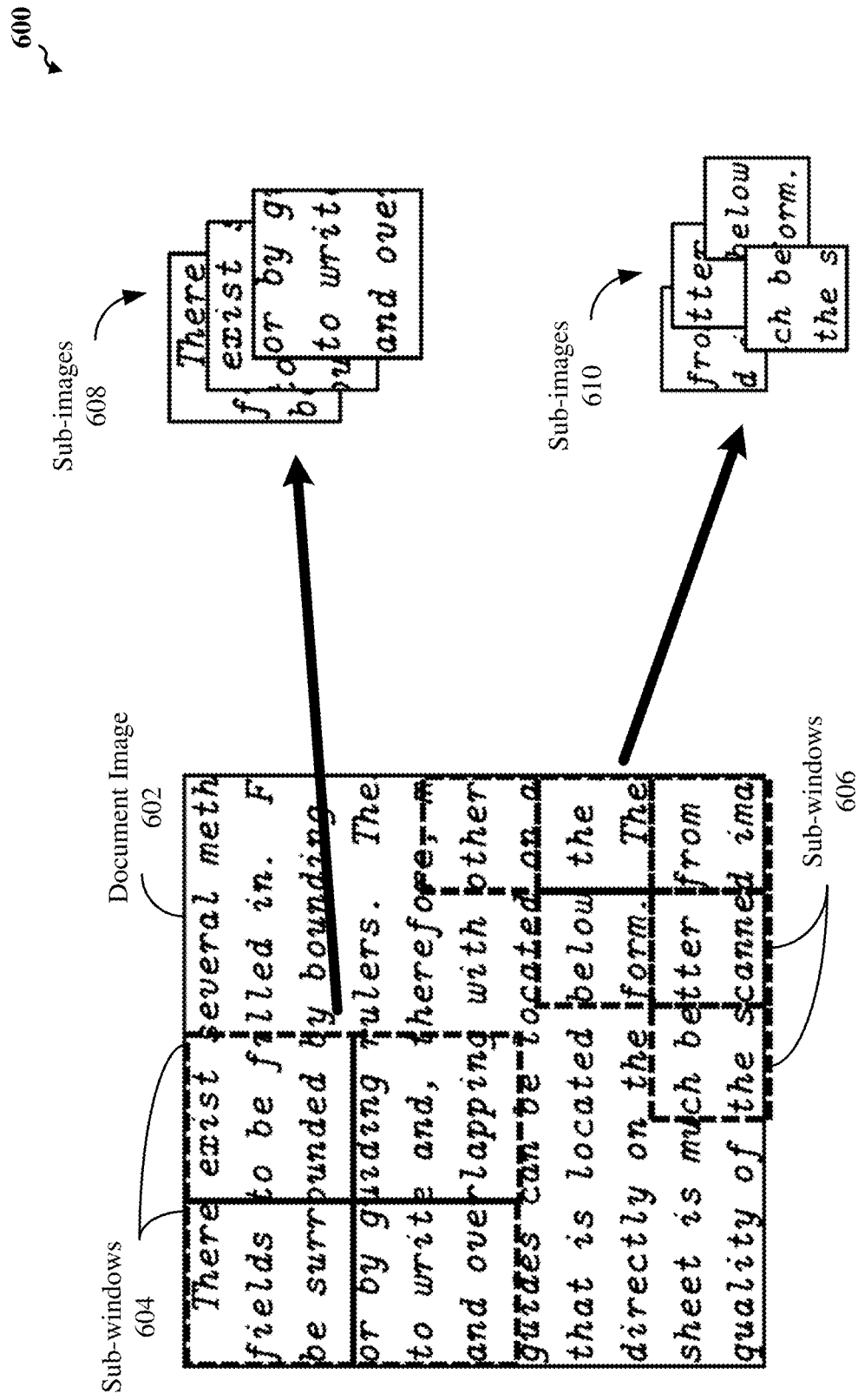
FIG. 6 shows an example sub-windowing of a document image into a plurality of sub-images, according to some implementations.

FIG. 6 shows an example sub-windowing 600 of a document image 602 into a plurality of sub-images, according to some implementations. To note, while the example document image 602 is depicted as a portion of a document page, the document image may be of any size and include any amount of content. In addition, while the example sub-windows are depicted as squares, any suitable shape may be used, such as rectangles, circles, or sided shapes having fewer or more than four sides. The sub-windowing 600 depicts two different example sizes of sub-windows 604 and 606 that may be used to sub-window the document image 602 to generate sub-images 608 and 610, respectively. In comparing the different size sub-windows, use of sub-window 604 generates fewer sub-images 608 than the use of sub-window 606 to generate sub-images 610, but the sub-images 608 have a higher resolution that the sub-images 610.

The sub-window that is used for sub-windowing may be determined in any suitable manner and be of any suitable size. In some implementations, the sub-window size may be defined by a programmer coding the sub-windowing data augmentation to be performed by a computing system, may be defined by a user overseeing the data augmentation, or may be adjustable or defined based on the resolution of the document image. For example, a mapping may be included, with the mapping defining the sub-window size to be used for different resolution document images. Larger resolution document images may have larger sub-windows used, while smaller resolution document images may have smaller sub-windows used so that the number of sub-images may be consistent across the document images. While some examples of defining the sub-window size are provided, the sub-window size may be determined in any suitable manner and is not limited to the provided examples.

Alternative to sub-windowing, in some implementations, a system performing data augmentation includes the system performing slide-windowing on one or more of the document images in the first set of document images and the second set of document images to generate additional document images. As compared to sub-windowing in which a sub-window is placed at neighboring locations in the document image (such as depicted in FIG. 6), slide-windowing includes moving (which may be referred to as "sliding") the sub-window a defined distance or shift across the document image to generate sub-images. For example, the sub-window may be initially placed at the top left of the document image to generate a first sub-image, incrementally slid 20 pixels to the right to generate additional sub-images, slid 20 pixels down once the right edge of the document image is reached, incrementally slid 20 pixels to the left until the left edge of the document image is reached, and so on in a snaking pattern until the sub-window completes sliding through the document image.

For slide-windowing, portions of the sub-window may overlap portions of the sub-window at other positions. For example, if a sub-window has a size of 40×40 pixels and the sub-window is to be slid 20 pixels up, down, left, or right, the sub-window overlaps nine times for a centroid pixel of the document image. As such, the content of that pixel is included in nine sub-images generated via slide-windowing.

Figure 7:
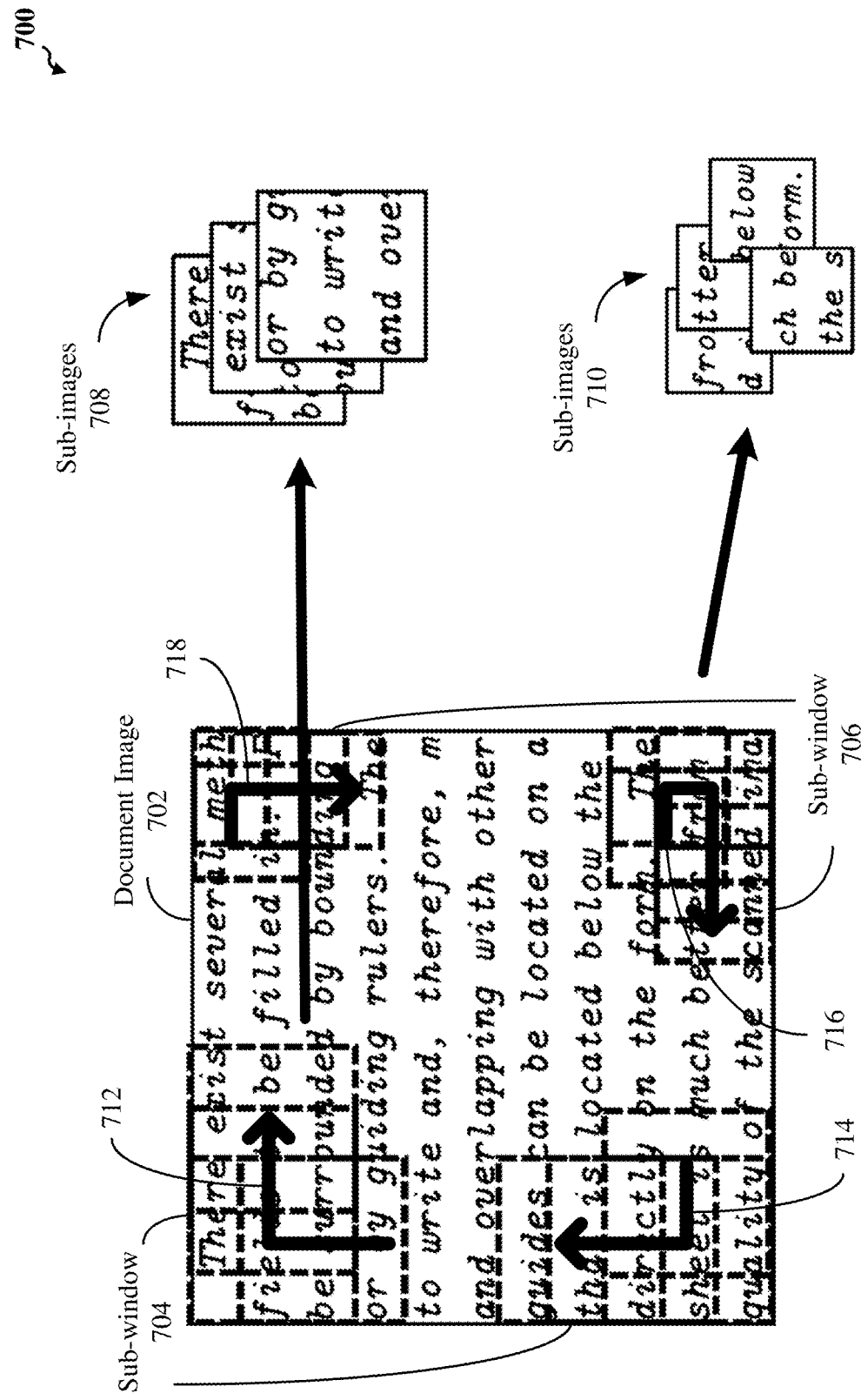
FIG. 7 shows an example slide-windowing of a document image into a plurality of sub-images, according to some implementations.

FIG. 7 shows an example slide-windowing 700 of a document image 702 into a plurality of sub-images, according to some implementations. In the example, the document image 702 is the same as the document image 602 in FIG. 6. The sub-window 704 may be the same size as the sub-window 604 in FIG. 6, and the sub-window 706 may be the same size as the sub-window 606 in FIG. 6. In the example, the sub-window 704 is slid across the document image 702 to generate the sub-images 708. The sub-window 706 is slid across the document image 702 to generate the sub-images 710. Arrows 712-718 depict example slide paths of the sub-window to generate the document images. To note, the sub-window size and shape for slide-windowing may be any suitable size and shape, such as described above with reference to sub-windowing. In addition, the shift, slide direction, and slide path of the sub-window for slide-windowing may be any suitable value or definition and may be defined in any suitable manner (such as by a programmer coding slide-windowing or by the user overseeing the data augmentation for training).

For sliding the sub-window in cardinal directions for slide-windowing, if the shift is smaller than the length of the sub-window, slide-windowing may generate significantly more sub-images than sub-windowing, but with multiple sub-images including portions of the same content from other sub-images. Thus, slide-windowing may be used instead of sub-windowing for smaller datasets in order to increase the number of generated document images for training the models 150 and 160. In some implementations, a system may be configured to select between sub-windowing and slide-windowing based on a size of the document image sets to be augmented. For example, if the number of document images in a set is greater than a threshold number, sub-windowing is used for data augmentation, while is the number of document images in the set is less than the threshold number, slide-windowing is used for data augmentation.

While sub-windowing and slide-windowing are depicted visually for clarity as sliding or stacking sub-windows to generate sub-images, a system may be configured to generate a copy of the pixel values at the locations of the document image associated with a sub-window during sub-windowing or slide-windowing in order to generate the sub-images. As such, generating sub-images using windowing techniques may be performed concurrently or in another efficient manner instead of sequentially as visually depicted for the purposes of explaining aspects of the present disclosure.

To note, since the set of source space document images corresponds to the set of target space document images in the training data, even though the pairings between the source space document images and the target space document images is unknown, the same data augmentation performed on the set of source space document images is performed on the set of target space document images. In this manner, the source space sub-images correspond to the target space sub-images, even though the pairings between such sub-images is unknown. For example, if sub-windowing is performed on the set of source space document images using a sub-window of a first size, sub-windowing is also performed on the set of target space document images using the sub-window of the first size. If slide-windowing is performed on the set of source space document images using a sub-window of a first size and a first shift, slide-windowing is also performed on the set of target space document images using the sub-window of the first size and the first shift.

With data augmentation implemented in training of the ML model 140 (such as the models 150 and 160), an algorithm for model training may be implemented in software using the following steps, provided the original training data includes a first set of source space document images $x^{(s)} \sim p_s(x)$ and a second set of target space document images $x^{(t)} \sim p_t(x)$. Step 1 is performing data augmentation for $x^{(s)}$ and $x^{(t)}$. For example, sub-windowing or slide-windowing may be performed on both the first set of source space document images and the second set of target space document images to generate additional sub-images in the corresponding sets. Step 2 is training the source model (such as a source diffusion model $v_\theta^{(s)}$) and the target model (such as a target diffusion model $v_\theta^{(t)}$) separately such that $v_\theta^{(s)}(x^{(s)}) \approx p_s(x)$ and $v_\theta^{(t)}(x^{(t)}) \approx p_t(x)$. Step 3 includes returning the trained source model $v_\theta^{(s)}$ and the trained target model $v_\theta^{(t)}$. The trained models of the ML model 140 may thus be used in the computing system 100 to perform document enhancement as described above (such as by performing operation 500 depicted in FIG. 5). To note, the algorithm for training the models may be coded in any suitable programming language or otherwise suitably implemented on a computing system. Training of the models may be implemented in the computing system 100 or may be implemented in a separate device or system, with the trained models transferred or copied after training into the computing system 100 for use.

As described above, various implementations of the present disclosure may be used to perform document enhancement in order to reduce or remove distortions in electronic document images. The provided implementations improve over existing systems by allowing data privacy to be kept during training of the models and during operations of the models to perform document enhancement.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c. The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for document image enhancement, the method comprising:
   obtaining an electronic document image by a machine learning (ML) model, wherein the electronic document image is generated from scanning a physical document; and
   enhancing the electronic document image by the ML model, including:
      translating the electronic document image in a source space to a latent space by a first implicit probabilistic model of the ML model, wherein the first implicit probabilistic model is trained based on translating electronic document images in the source space to the latent space; and
      translating the electronic document image in the latent space to a target space by a second implicit probabilistic model of the ML model, wherein:
         the second implicit probabilistic model is trained independently from the first implicit probabilistic model;
         the second implicit probabilistic model is trained based on translating electronic document images in the target space to the latent space; and
         the second implicit probabilistic model includes a second cycle consistent model to translate the electronic document image between the latent space and the target space, wherein the second cycle consistent model is configured to reverse the function of translating a target space document image to a latent space document image to translate the electronic document image in the latent space to the target space; and
   providing the enhanced electronic document image in the target space to an object character recognition (OCR) engine to perform OCR.

2. The computer-implemented method of claim 1, wherein:
   the first implicit probabilistic model includes a first cycle consistent model to translate the electronic document image between the source space and the latent space.

3. The computer-implemented method of claim 2, wherein:
   the first cycle consistent model includes a first diffusion model; and
   the second cycle consistent model includes a second diffusion model.

4. The computer-implemented method of claim 3, wherein the first diffusion model includes a first denoising diffusion implicit model (DDIM) based on solving a first ordinary differential equation (ODE) for encoding the electronic document image from the source space to the latent space.

5. The computer-implemented method of claim 3, wherein the second diffusion model includes a second denoising diffusion implicit model (DDIM) based on solving a second ordinary differential equation (ODE) for encoding the electronic document image from the target space to the latent space.

6. The computer-implemented method of claim 1, further comprising performing OCR on the enhanced electronic document image in the target space by the OCR engine to generate an OCR document.

7. A computing system for document image enhancement, the computing system comprising:
   one or more processors; and
   a memory storing instructions that, when executed by the one or more processors, causes the computing system to perform operations comprising:
      obtaining an electronic document image by a machine learning (ML) model of the computing system, wherein the electronic document image is generated from scanning a physical document;
      enhancing the electronic document image by the ML model, including:
         translating the electronic document image in a source space to a latent space by a first implicit probabilistic model of the ML model, wherein the first implicit probabilistic model is trained based on translating electronic document images in the source space to the latent space; and
         translating the electronic document image in the latent space to a target space by a second implicit probabilistic model of the ML model, wherein:
            the second implicit probabilistic model is trained independently from the first implicit probabilistic model;
            the second implicit probabilistic model is trained based on translating electronic document images in the target space to the latent space; and
            the second implicit probabilistic model includes a second cycle consistent model to translate the electronic document image between the latent space and the target space, wherein the second cycle consistent model is configured to reverse the function of translating a target space document image to a latent space document image to translate the electronic document image in the latent space to the target space; and providing the enhanced electronic document image in the target space to an object character recognition (OCR) engine to perform OCR.

8. The computing system of claim 7, wherein:

the first implicit probabilistic model includes a first cycle consistent model to translate the electronic document image between the source space and the latent space.

9. The computing system of claim 8, wherein:

the first cycle consistent model includes a first diffusion model; and the second cycle consistent model includes a second diffusion model.

10. The computing system of claim 9, wherein the first cycle consistent model includes a first denoising diffusion implicit model (DDIM) based on solving a first ordinary differential equation (ODE) for encoding the electronic document image from the source space to the latent space.

11. The computing system of claim 9, wherein the second cycle consistent model includes a second denoising diffusion implicit model (DDIM) based on solving a second ordinary differential equation (ODE) for encoding the electronic document image from the target space to the latent space.

12. The computing system of claim 7, wherein the operations further comprise performing OCR on the enhanced electronic document image in the target space by the OCR engine to generate an OCR document.

\* \* \* \* \*